(12) United States Patent
Conner et al.

(10) Patent No.: US 7,445,340 B2
(45) Date of Patent: Nov. 4, 2008

(54) POLARIZED, LED-BASED ILLUMINATION SOURCE

(75) Inventors: Arlie R Conner, Portland, OR (US);
Sean M. Donnelly, Portland, OR (US);
Peter R. Oehler, Aloha, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 329 days.

(21) Appl. No.: 11/216,258

(22) Filed: Aug. 31, 2005

(65) Prior Publication Data
US 2006/0262514 A1 Nov. 23, 2006

Related U.S. Application Data

(60) Provisional application No. 60/682,451, filed on May 19, 2005.

(51) Int. Cl.
*G03B 21/14* (2006.01)
*G03B 21/26* (2006.01)
*G03B 21/28* (2006.01)
*F21V 7/04* (2006.01)

(52) U.S. Cl. ............... 353/20; 353/37; 353/50; 353/81; 353/94; 362/555

(58) Field of Classification Search ............. 353/20, 353/37, 50, 81, 94; 362/551, 555
See application file for complete search history.

(56) References Cited

U.S. PATENT DOCUMENTS

| | | | |
|---|---|---|---|
| 4,763,975 A | 8/1988 | Scifres et al. | |
| 4,912,614 A | 3/1990 | Goldenberg | |
| 5,224,198 A | 6/1993 | Jachimowicz et al. | |
| 5,255,171 A | 10/1993 | Clark | |
| 5,285,318 A | 2/1994 | Gleckman | |
| 5,359,446 A | 10/1994 | Johnson et al. | |
| 5,394,204 A | 2/1995 | Shigeta et al. | |

(Continued)

FOREIGN PATENT DOCUMENTS

DE    10321019    12/2004

(Continued)

OTHER PUBLICATIONS

Petroski, James, "Spacing of High-Brightness LEDs on Metal Substrate PCB's for Proper Thermal Performance", *2004 Inter Society Conference on Thermal Phenomena*, pp. 507-514.

(Continued)

*Primary Examiner*—Diane I. Lee
*Assistant Examiner*—Magda Cruz

(57) ABSTRACT

An illumination source includes a number of light emitting diodes (LEDs) operating at a first wavelength. Light from the LEDs illuminates a phosphor material that generates light at a second wavelength. A reflective polarizer transmits light at the second wavelength in a first polarization state and reflects light at the second wavelength in a second polarization state orthogonal to the first polarization state. The light at the second wavelength reflected by the reflective polarizer is directed back towards the phosphor material without an increase in angular range. In some embodiments the LEDs, having a conformal layer of phosphor material, are attached directly to the first surface of a liquid cooled plate. A liquid coolant contacts a second surface of the plate.

21 Claims, 9 Drawing Sheets

U.S. PATENT DOCUMENTS

| | | | |
|---|---|---|---|
| 5,580,142 | A | 12/1996 | Kurematsu et al. |
| 5,625,738 | A | 4/1997 | Magarill |
| 5,655,832 | A | 8/1997 | Pelka et al. |
| 5,868,481 | A | 2/1999 | Conner et al. |
| 5,962,114 | A | 10/1999 | Jonza et al. |
| 6,023,373 | A | 2/2000 | Inoguchi et al. |
| 6,104,446 | A | 8/2000 | Blankenbecler et al. |
| 6,144,536 | A | 11/2000 | Zimmerman et al. |
| 6,157,353 | A | 12/2000 | Song et al. |
| 6,191,872 | B1 | 2/2001 | DeCaro et al. |
| 6,227,669 | B1 | 5/2001 | Tiao et al. |
| 6,318,863 | B1 | 11/2001 | Tiao et al. |
| 6,325,524 | B1 | 12/2001 | Weber et al. |
| 6,332,688 | B1 | 12/2001 | Magarill |
| 6,364,487 | B1 | 4/2002 | Weber et al. |
| 6,523,959 | B2 | 2/2003 | Lee et al. |
| 6,547,400 | B1 | 4/2003 | Yokoyama |
| 6,560,038 | B1 | 5/2003 | Parkyn, Jr. et al. |
| 6,631,997 | B2 | 10/2003 | Miyata et al. |
| 6,648,475 | B1 | 11/2003 | Roddy et al. |
| 6,682,207 | B2 | 1/2004 | Weber et al. |
| 6,721,096 | B2 | 4/2004 | Bruzzone et al. |
| 6,767,111 | B1 | 7/2004 | Lai |
| 6,769,772 | B2 | 8/2004 | Roddy et al. |
| 6,769,773 | B1 | 8/2004 | Wu |
| 6,850,095 | B2 | 2/2005 | Sayers et al. |
| 6,857,748 | B2 | 2/2005 | Roddy et al. |
| 6,869,206 | B2 | 3/2005 | Zimmerman et al. |
| 6,882,379 | B1 | 4/2005 | Yokoyama et al. |
| 2002/0030194 | A1 | 3/2002 | Camras et al. |
| 2003/0193649 | A1 | 10/2003 | Seki |
| 2003/0218880 | A1 | 11/2003 | Brukilacchio |
| 2004/0001239 | A1 | 1/2004 | Brukilacchio et al. |
| 2004/0116033 | A1 | 6/2004 | Ouderkirk et al. |
| 2004/0150997 | A1 | 8/2004 | Ouderkirk et al. |
| 2004/0233664 | A1 | 11/2004 | Beeson et al. |
| 2004/0264185 | A1 | 12/2004 | Grotsch et al. |
| 2005/0023545 | A1 | 2/2005 | Camras et al. |
| 2005/0185419 | A1 | 8/2005 | Holman et al. |
| 2005/0270775 | A1 | 12/2005 | Harbers et al. |
| 2005/0280785 | A1 | 12/2005 | Beeson et al. |
| 2006/0092639 | A1 | 5/2006 | Livesay et al. |
| 2006/0227302 | A1* | 10/2006 | Harbers et al. ................ 353/94 |
| 2007/0146639 | A1* | 6/2007 | Conner ........................ 353/20 |

FOREIGN PATENT DOCUMENTS

| | | |
|---|---|---|
| DE | 10321020 | 12/2004 |
| EP | 0 322070 | 6/1989 |
| JP | 09-197401 | 7/1997 |
| JP | 10-123512 | 2/1998 |
| JP | 2000/231344 | 8/2000 |
| JP | 2003/330109 | 11/2003 |
| WO | 97/36552 | 10/1997 |
| WO | WO/2001/043113 | 6/2001 |
| WO | WO/2003/056876 | 7/2003 |
| WO | WO/2004/097516 | 11/2004 |
| WO | WO/2004/107018 | 12/2004 |

OTHER PUBLICATIONS

Teijido, Juan Manuel, "Optical design for LED based devices", *Light Emitting Diodes 2003* (Oct. 15-17, 2002) pp. 1-15-2.

Valenzuela, Javier A., et al., "Cooling High Heat Flux Devices with *Mikros* Microchannel Cold Plates", *Mikros Technologies Inc.*, pp. 1-13.

"G-SiC® XThin™ TM LEDs CxxxXT290-Sxx00-A" 2003-2004 Cree, Inc.

"Elpor material from Heatron finds applications in high-power LED light engines," *LEDs Magazine*, Nov. 2004, <http://www.ledsmagazine.com/articles/features/1/11/11/1>.

* cited by examiner

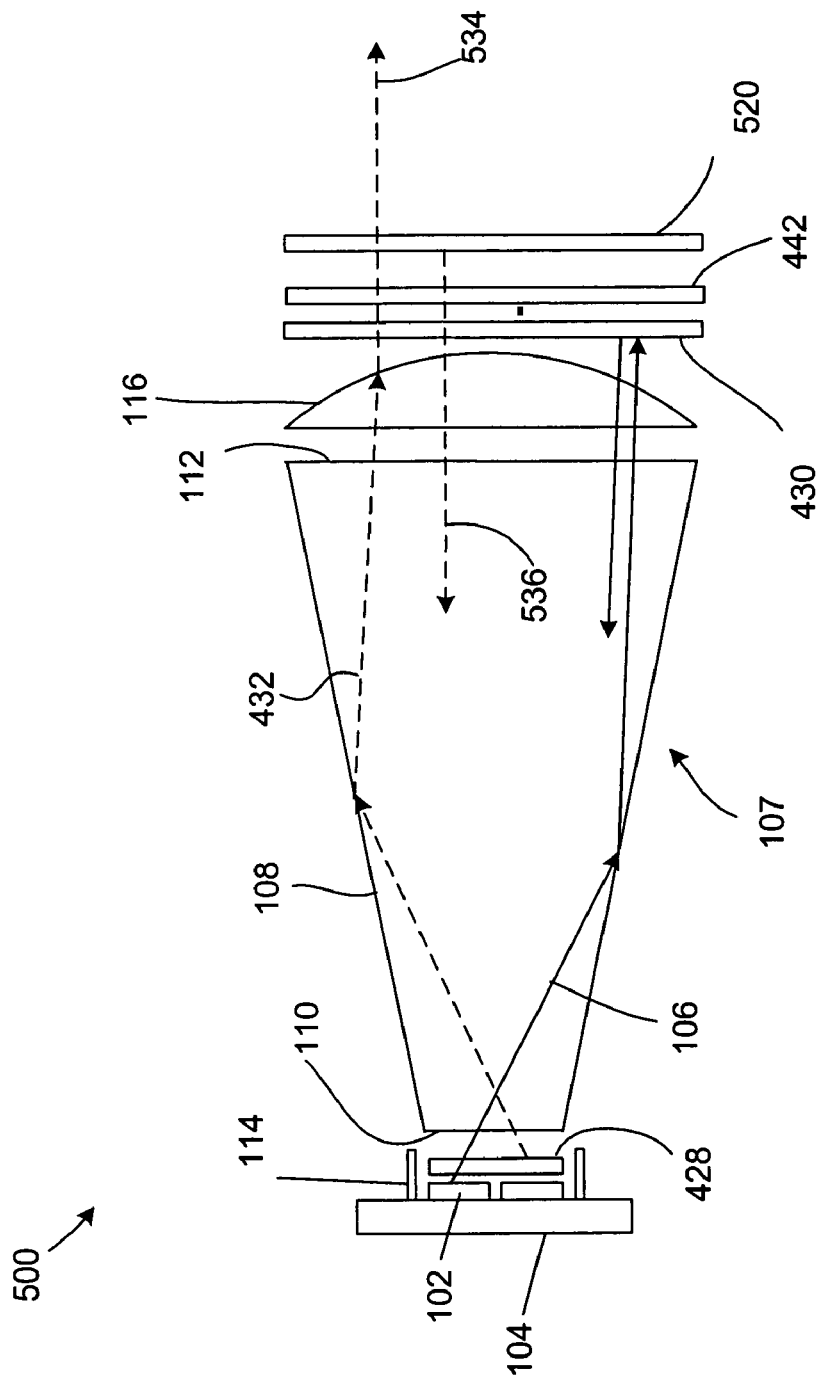

POLARIZED, LED-BASED ILLUMINATION SOURCE

RELATED APPLICATIONS

This application claims priority from U.S. Provisional Patent Application Ser. No. 60/682,451, filed on May 19, 2005, and which is incorporated herein by reference.

FIELD OF THE INVENTION

The present invention relates to illumination systems that may be used in image projection system. More specifically, the invention relates to illumination systems that include an array of light emitting elements, such as light emitting diodes (LEDs) to generate polarized light.

BACKGROUND

Illumination systems may be found in many different applications, including image projection display systems, backlights for liquid crystal displays and the like. Projection systems usually use a source of light, illumination optics to pass the light to one or more image-forming devices, projection optics to project the image(s) from the image-forming device(s) and a projection screen on which the image is displayed. The image-forming device(s) are controlled by an electronically conditioned and processed video signal.

White light sources, such as high pressure mercury lamps, have been, and still are, the predominant light sources used in projection display systems. In a three-panel image-projection system, the white light beam is split into three primary color channels, red, green and blue, and is directed to respective image-forming device panels that produce the image for each color. The resulting primary-colored image beams are combined into a full color image beam that is projected for display. Some other projection systems use a single imager panel, and so rotating color wheels, or some other type of time-sequential color filter, is used to filter the white light so that light at one primary color is incident on the image-display device at any one time. The light incident at the panel changes color sequentially to form colored images synchronously with the incident light. The viewer's eye integrates the sequentially colored images to perceive a full color image.

More recently, light emitting diodes (LEDs) have been considered as an alternative to white light sources. In some cases, different illumination channels are powered by respectively colored LEDs, or arrays of LEDs. For example, blue LEDs are used to illuminate the blue channel and red LEDs are used to illuminate the red channel. Some types of image display device, such as a liquid crystal display (LCD), employ polarized light, whereas the LEDs produce unpolarized light, and so only half of the generated light is usable by the LCD. Furthermore, LEDs that operate in the green region of the visible spectrum are known to be relatively inefficient, compared to blue and red LEDs, and so many systems require more green LEDs than blue or red LEDs. This problem of inefficiency in the green portion of the spectrum is compounded when the light is required to be polarized.

There remains a need for a solid state light source that efficiently generates green polarized light.

SUMMARY OF THE INVENTION

One embodiment of the invention is directed to an illumination source that includes an arrangement of one or more light emitting diodes (LEDs) capable of generating light at a first wavelength. A phosphor material disposed proximate the one or more LEDs, the phosphor material emitting light at a second wavelength when illuminated by the light at the first wavelength. The source also includes a light collecting/focusing unit having at least a tapered optical element. A reflective element is disposed to reflect light at the first wavelength that has passed through the phosphor material. A reflective polarizer is disposed to transmit light at the second wavelength in a first polarization state and to reflect light at the second wavelength in a second polarization state orthogonal to the first polarization state. Light at the second wavelength reflected by the reflective polarizer is directed back towards the phosphor material without an increase in angular range.

Another embodiment of the invention is directed to an illumination source that includes an array of one or more light emitting diodes (LEDs) capable of emitting light at a first wavelength. There is a first light collecting/focusing unit to form at least some of the light at the first wavelength into a telecentric beam. A phosphor is capable of generating light at a second wavelength when illuminated by light at the first wavelength. The telecentric beam is directed to the phosphor. A reflective polarizer is disposed to transmit light at the second wavelength, received from the phosphor, in a first polarization state and to reflect light at the second wavelength in a second polarization state back to the phosphor.

Another embodiment of the invention is directed to an illumination source that includes an array of one or more light emitting diodes (LEDs). The LEDs are attached directly to a first surface of the a liquid cooled plate. A liquid coolant contacts a second surface of the liquid cooled plate. A phosphor layer is conformally disposed on the one or more LEDs.

Another embodiment of the invention is directed to a method of manufacturing an illumination source. The method includes providing one or more (LED) dies having a metallic layer on respective LED lower surfaces and placing the LED dies in thermal contact with a first surface of a plate whose temperature is controllable by flowing a fluid past a second surface of the metal plate. A heated fluid is passed by the second surface of the plate so as to melt the metallic layer. The metallic layer is cooled so that the metallic layer solidifies, thereby attaching the LED dies to the first surface of the liquid cooled plate.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 5A and 5B schematically illustrate additional exemplary embodiments of illumination light sources according to principles of the present invention;

Figure 1:
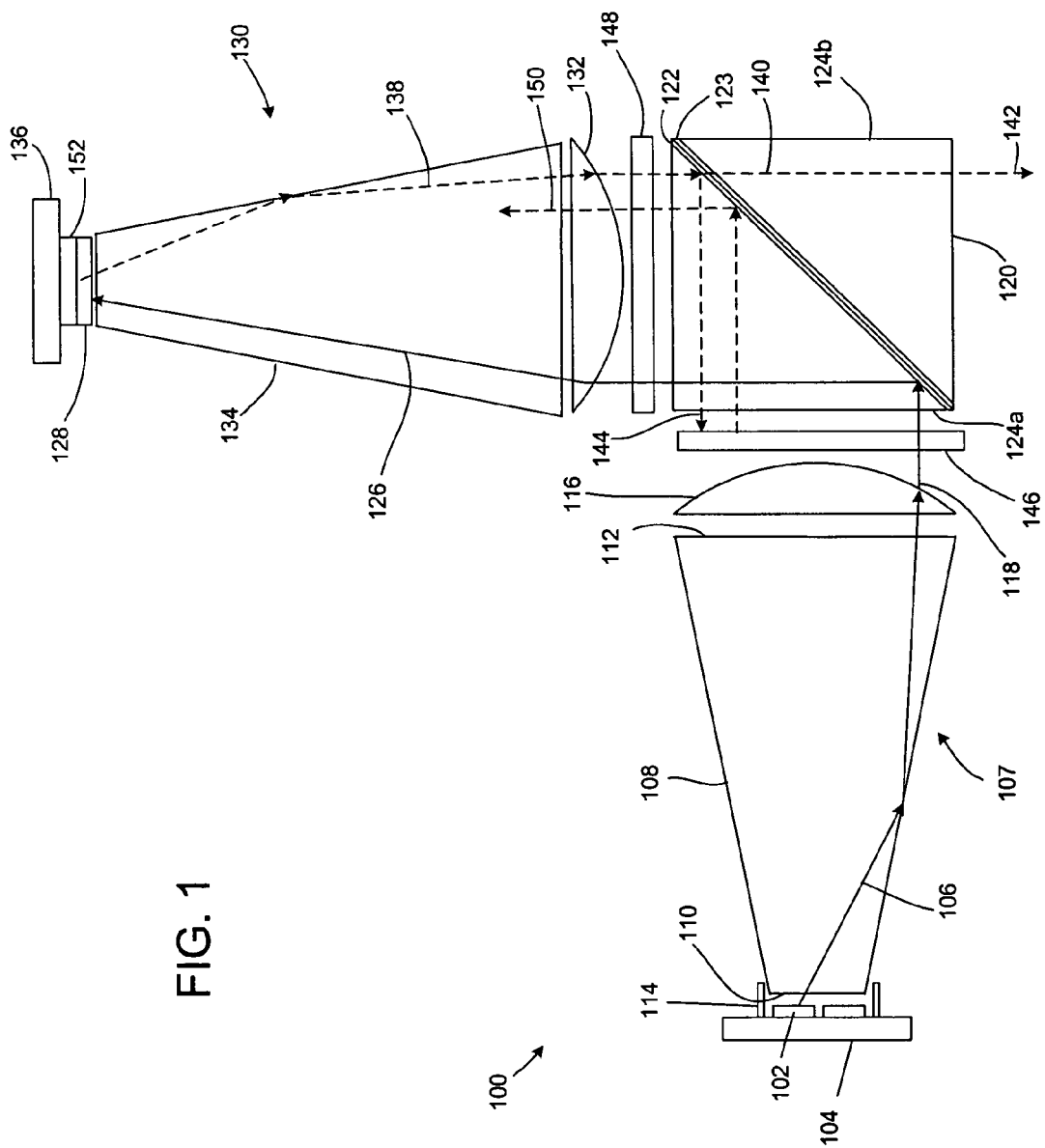
FIG. 1 schematically illustrates an exemplary embodiment of an illumination light source according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to illumination systems, and is more particularly applicable to illumination system for displaying images, for example projection systems such as may be used in projection televisions and displays, monitors and the like.

It is well known that green light emitting diodes (LEDs) are less efficient than LEDs operating in the blue and red regions of the visible spectrum. Consequently, LED-based illumination systems require more green LEDs than blue and red LEDs to achieve desired levels of brightness and color balance. Instead of generating green light directly with an LED, another approach is to generate light at a first wavelength, for example blue or UV wavelengths, and to convert the light at the first wavelength to a green wavelength.

One exemplary approach that may be useful for wavelength converting light from an LED to generate green light is schematically illustrated in FIG. 1. An exemplary illumination system 100 has an array of one or more LEDs 102 mounted on a baseplate 104. The baseplate 104 may be used for providing electrical power to the LEDs 102 and also for extracting heat from the LEDs.

At least some of the light 106 from the LEDs 102 is collected in a first light collecting/focusing unit 107. In the illustrated embodiment, the light collecting/focusing unit 107 includes a light pipe 108 having an input 110 and an output 112.

Figure 2:
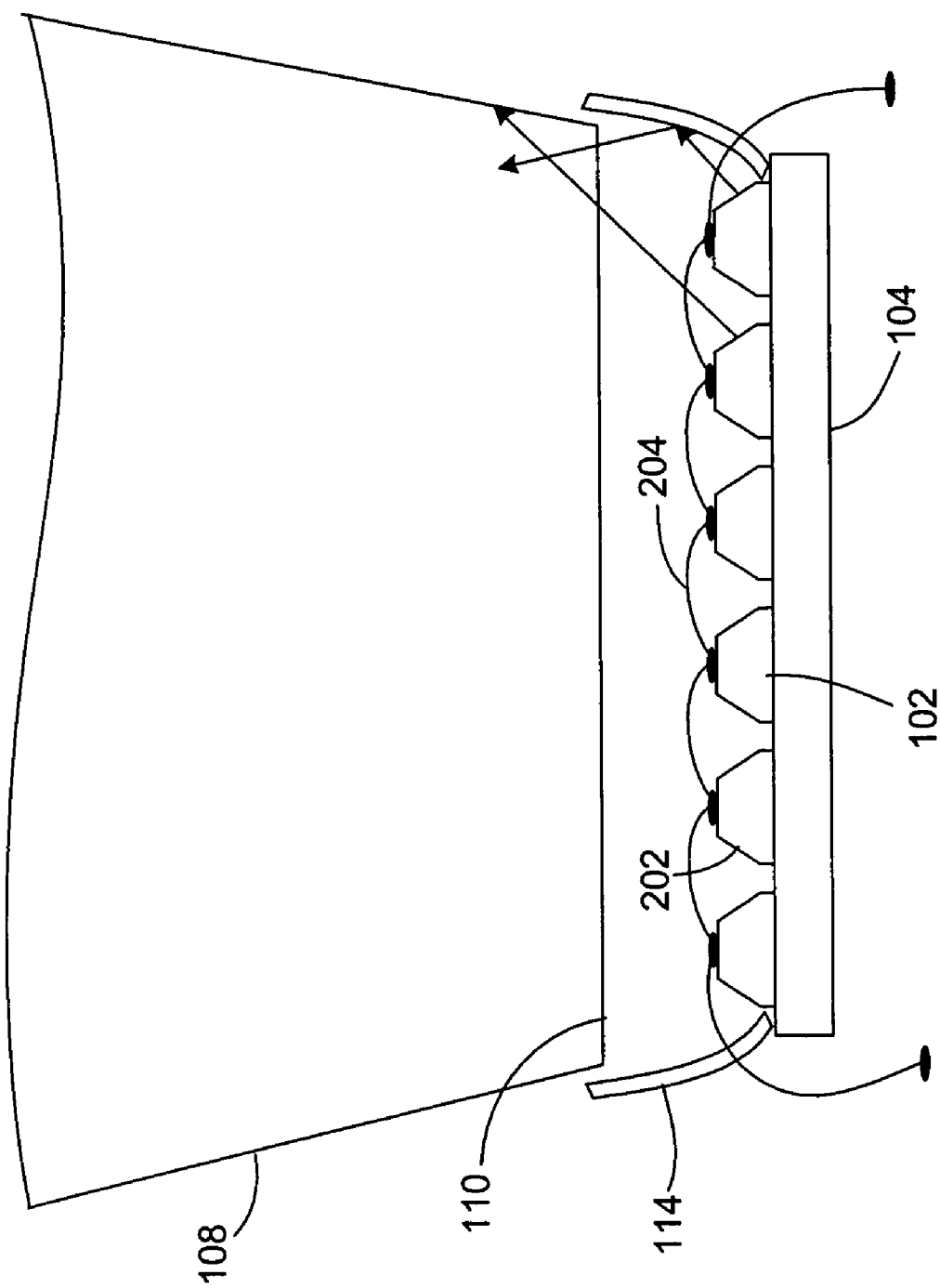
FIG. 2 schematically illustrates an embodiment of an array of light emitting diodes as part of an illumination light source.

A side view of an array of LEDs 102 mounted on a baseplate 104 is schematically illustrated in FIG. 2. Some commercially available LEDs that may be used in the illumination system emit light through the upper surface, facing the light pipe 108. Other types of commercially available LEDs, as shown, emit light out of angled faces 202 of the LED dies.

In some exemplary embodiments, a reflective element 114 may be disposed close to the LED array. The reflective element 114 surrounds at least part of the input 110 to reduce the amount of light that leaks away from the input 110 of light pipe 108. The reflective element 114 may be desired, for example, where the input 110 is separated from the LEDs 102 by a small distance due to interference of the wirebonds 204 used to make electrical connection to the top of the LEDs 102. This configuration, with the reflective element 114, allows a reduced number of LEDs 102 to be used, thus reducing cost and power consumption, while still filling the light pipe 108. The reflective element 114 may include a metalized or multilayered reflective coating.

In some exemplary embodiments, the light pipe 108 is a tapered solid rectangular prism located directly over LEDs 102. The input 110 of the light pipe 108 may be made small so as to prevent an increase in the étendue of the system. The étendue is the product of the area of the light beam at the light source times the solid angle of the light beam. The étendue of the light cannot be reduced but can be increased by the optical system. This reduces the total brightness of the light illuminating the display, since the brightness is given by the optical flux divided by the étendue. Thus, if the area of the light beam is increased, for example to cover the active area of the imager device, it is sufficient that the angular range of the beam be reduced proportionally in order to conserve the étendue of the light beam. By conserving the étendue, the brightness of the illumination light incident at the imager device is maintained at, or close to, the highest achievable level.

In the exemplary embodiment shown in FIG. 1, the maximum flux per étendue is obtained when the LEDs 102 are non-encapsulated LED dies, emitting light 106 into the air with no additional epoxy, silicone or other intervening material so that LEDs 102 are separated from the input 110 of the light pipe 108 by an air gap. This configuration may improve the reliability of LEDs 102 by eliminating organic and polymer layers that might be degraded by high temperatures and light flux. In some embodiments, it may be desired to include some encapsulation between the LEDs 102 and the input 110, for example for environmental protection.

It has been found that a light collection efficiency in the range of 80%-90% can be obtained by a light pipe 108 in gathering the light emitted by LEDs 102. In some exemplary embodiments, the light pipe 108 may have a length that is between two and ten times longer than its width at the output, although the light pipe 108 may also operate outside this range. As the length of light pipe 108 is increased, the uniformity of the light at the output 112 increases. If the light pipe 108 becomes too long, however, the system becomes more bulky and expensive, and less light exits from the light pipe 108 dues to losses within the light pipe 108. Other configurations of light pipe 108 may also be used, such as a hollow tunnel rather than a solid light pipe.

In some embodiments, the light collecting/focusing unit 107 may also include a focusing optic 116, such as a lens, at the output 112. The focusing optic 116 may be separate from the light pipe 108 or may be integrated with the light pipe 108.

The light 118 output from the light collecting/focusing unit 107 may be substantially telecentric. The term "telecentric" means that the angular range of the light is substantially the same for different points across the beam. Thus, if a portion of the beam at one side of the beam contains light in a light cone having a particular angular range, then other portions of the beam, for example at the middle of the beam and at the other side of the beam contain light in substantially the same angular range. Consequently, the light beam is telecentric if light at the center of the beam is directed primarily along an axis and is contained within a particular cone angle while light at the edges of the beam is also directed along the axis and has substantially the same cone angle. If the light pipe 108 is sufficiently long, then the light 118 at the output 112 may be sufficiently telecentric without the need for a focusing optic 116. Use of a focusing optic 116 permits the light collecting/focusing unit 107 to be shorter while still producing a telecentric output. The fraction of the light that is subsequently concentrated at the phosphor for frequency conversion is increased when the light is telecentric.

In some exemplary embodiments, the focusing optic 116 may be integrated with the light pipe 108, or may be separate from the light pipe 108. In other exemplary embodiments, the light pipe 108 may be provided with curved sidewalls that perform a focusing function.

The light 118 is passed into a polarizing beamsplitter (PBS) 120. The PBS 120 may be any suitable type of PBS, for example a MacNeille-type PBS or a multilayer optical film (MOF) PBS, such as an MZIP PBS as described in U.S. Pat. Nos. 5,962,114 and 6,721,096, incorporated herein by reference. Other suitable types of PBS include wire grid and cholesteric PBSs. The PBS 120 typically contains a polarization selective layer 122 disposed between the hypotenuse faces of two right-angled prisms 124a and 124b, although other configurations may be used. The polarization selective layer 122 reflects light in one polarization state and transmits light in the orthogonal polarization state. The PBS 120 may also include a reflecting film 123 disposed between the polarization selective layer 122 and the second prism 124b. The reflecting layer 123 reflects the light from the LEDs 102 that is transmitted through the polarization selective layer 122. The reflecting film 123 is reflective at the first wavelength of light generated by the LEDs 102 and is transmissive at the second wavelength of light generated by the phosphor: this configuration of reflector may be referred to as a long pass reflective filter.

As will become apparent below, in this particular embodiment, the PBS 120 is used for polarizing the light at the second wavelength generated by the phosphor, and the effects of the PBS 120 on the light 118 at the first wavelength may be essentially ignored. For example, in some embodiments, the polarization selective layer 122 may be designed to be essentially transparent for both polarizations of the light 118 at the first wavelength. In such a case, the reflecting film 123 reflects both polarization states of the light 118 at the first wavelength. In other embodiments, the polarization selective layer 122 may reflect the light at the first wavelength in one polarization state, in which case the reflecting film 123 reflects the light 118 at the first wavelength in the second polarization state that is transmitted through the polarization selective layer 122.

The light 126 at the first wavelength reflected by the PBS 120 is directed to a color converting phosphor 128. The phosphor 128 contains a material that absorbs the light 126 generated by the LEDs 102 and generates light at a second wavelength, typically longer than the first wavelength. In some exemplary embodiments, the phosphor 128 may convert blue or UV light to green light. One particularly suitable example of a phosphor material is Eu-doped strontium thiogallate (SrGa$_2$S$_4$:Eu), although other types of phosphor materials may also be used, for example rare earth doped nitrides and oxy-nitrides, such as europium doped silicon aluminum oxy-nitride (SiAlON:Eu) and rare-earth doped garnets, such as cerium doped yttrium aluminum garnet (Ce:YAG).

The light 126 may pass through a second light collecting/focusing arrangement 130 on the way to the phosphor 128. The second light collecting/focusing arrangement 130 may be configured like the first light collecting/focusing arrangement 107, having a focusing optic 132 and a light pipe 134, or may be configured differently. The focusing optic 132 and light pipe 134 concentrate the light 126 on the phosphor 128.

The phosphor 128 may be mounted on a baseplate 136 that, in some exemplary embodiments, operates as a heatsink for removing excess heat. The light 138 at the second wavelength (dashed lines) is directed back through the second light collecting/focusing arrangement 130 to the PBS 120, which transmits the p-polarized light 140 as useful output 142 and reflects the s-polarized light 144. Some element behind the phosphor 128 may be used to reflect light at the second wavelength that originally is generated traveling in a direction away from the PBS 120. For example, the baseplate 136 itself may be reflective, or an optional reflector 152 may be disposed between the phosphor 128 and the baseplate 136. One example of a suitable reflector 152 includes a metal coating on the baseplate 136, for example a silver coating. Another example of a reflector 152 includes Enhanced Specular Reflector (ESR) film available from 3M Company, St. Paul, Minn.

A reflective filter 146, transmissive at the first wavelength and reflective at the second wavelength, may be disposed between the PBS 120 and the first light collecting/focusing arrangement 107 to reflect the s-polarized light 144 back to the phosphor 128 via the PBS 120. The reflected light 150 may subsequently be re-reflected, for example by the phosphor 128, the baseplate 136 or the reflector 152, back towards the PBS 120.

A polarization converter 148 may be disposed between the PBS 120 and the phosphor 128 so that at least some of the light 150 reflected back to the phosphor 128 is subsequently returned to the PBS 120 in the polarization state that is transmitted as useful output 142.

One characteristic of the system 100 illustrated in FIG. 1 is that the light 126 at the first wavelength is incident at the phosphor with an étendue substantially similar to that of the light 106 emitted by the LEDs 102. Consequently, the étendue of the output light 142 at the second wavelength is similar to what would have been achieved by generating the light at the second wavelength directly using the appropriate LEDs. This permits the output light 142 to be efficiently used in an illumination application, for example illuminating an LCD imager device.

Figure 3:
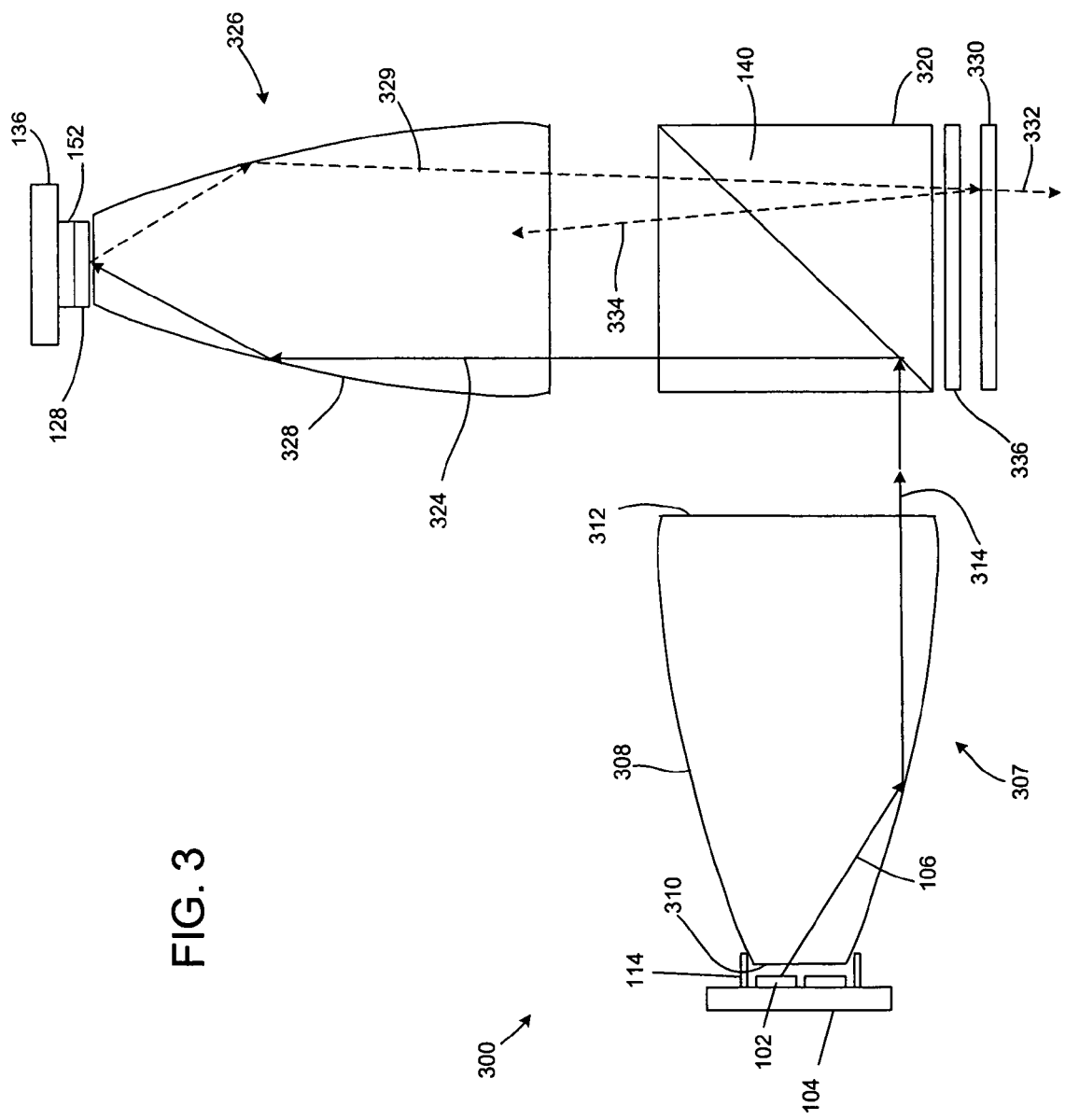
FIG. 3 schematically illustrates another exemplary embodiment of an illumination light source according to principles of the present invention.

Another exemplary embodiment of an illumination system 300 that includes a phosphor for converting light wavelength and that produces a polarized output is schematically illustrated in FIG. 3. In this embodiment, the light from the LEDs 102 is passed through a light collection/focusing unit 307 that includes a light pipe 308 having an input 310 and an output 312. The light pipe 308 in this particular embodiment has curved sidewalls so that the light 314 at the output 312 is substantially telecentric. The light 314 passes to a dichroic beamsplitter 320 that has the property of reflecting light at the first wavelength and transmitting light at the second wavelength. The light 324 at the first wavelength that is reflected by the dichroic beamsplitter is directed through a second light collecting/focusing unit 326 to the phosphor 128. The second light collecting/focusing unit 326 may also comprise a light pipe 328 having curved sidewalls, or may comprise an optical arrangement different from that of the first light collecting/focusing unit 307.

The light 329 at the second wavelength passes through the second light collecting/focusing arrangement 326 and is transmitted through the dichroic beamsplitter 320. A polarizer 330, for example a wire grid polarizer, a MOF polarizer or a cholesteric polarizer, transmits light 332 in one polarization state as useful output and reflects light 334 in the orthogonal polarization state back to the phosphor 128. A polarization control element 336, for example a quarter-wave retarder, may be positioned between the polarizer 330 and the dichroic beamsplitter 320. The reflected light 334 is incident once again at the phosphor 128 and is reflected back towards the polarizer 330 by the phosphor 128, the baseplate 136 or the reflector 152. The polarization control element 336 is used to rotate the polarization of at least some of the light that is recycled back to the polarizer 330.

Additionally, at least some of the light at the first wavelength that is not converted by the phosphor 128 to the second wavelength may be returned to the LEDs 102 via reflection at one of the phosphor 128, reflector 152 or baseplate 136, and reflection at the dichroic beamsplitter 320. Such reflected light at the first wavelength may be recycled to the phosphor 128 by reflection from the baseplate 104 or the LEDs 102.

In another exemplary embodiment, not illustrated, the dichroic beamsplitter may transmit the light at the first wavelength and reflect the light at the second wavelength. In such a configuration, the LEDs and phosphor are typically positioned on opposing sides of the dichroic beamsplitter.

In some exemplary embodiments, the phosphor may be disposed close to the LEDs, or the LEDs may even be conformally coated with the phosphor material. Such a configuration may lead to a reduction in the number of elements used in the illumination system. Also, in some cases, the LEDs are formed of a material, such as silicon carbide, which is effective at transferring heat from the phosphor to the baseplate.

Figure 4:
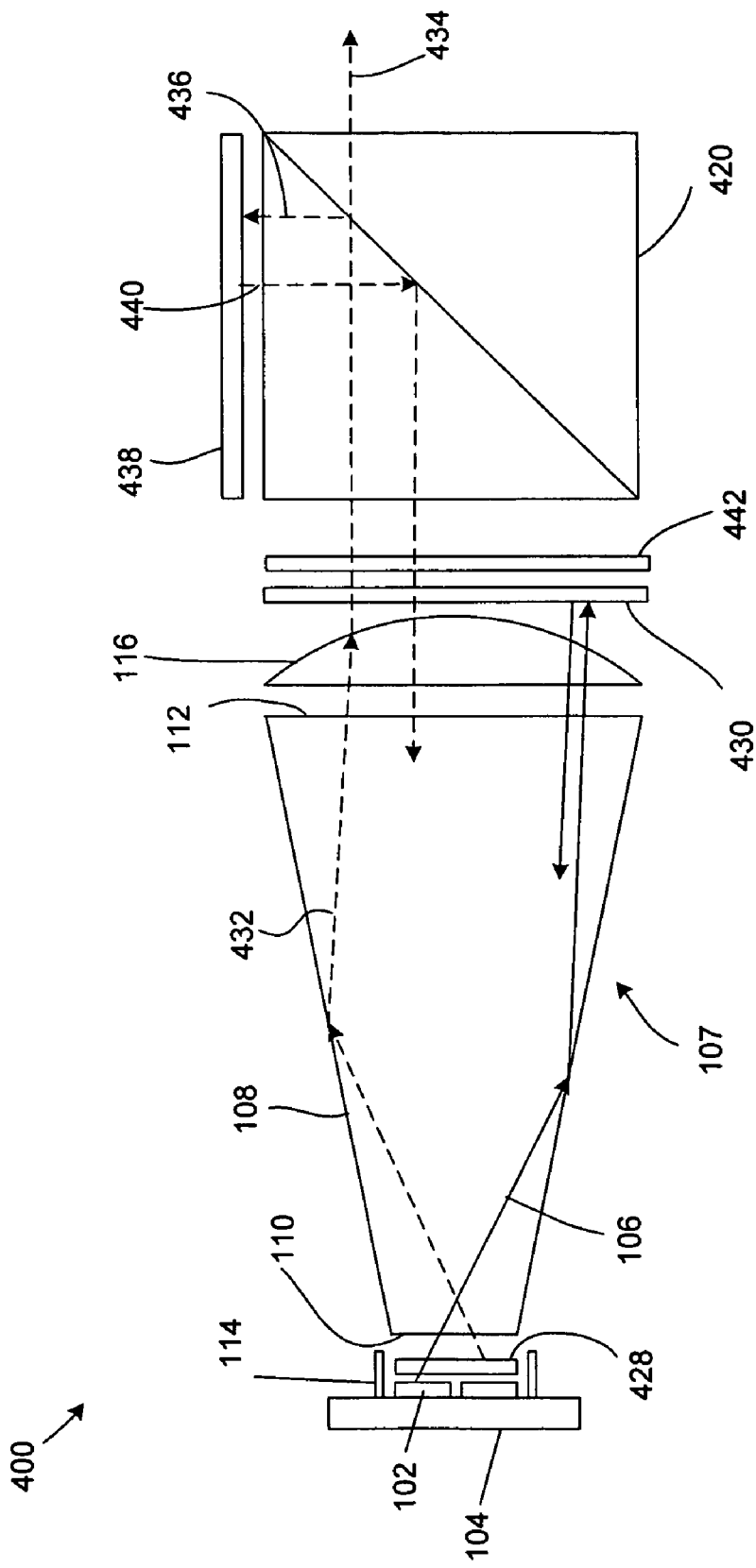
FIG. 4 schematically illustrates another exemplary embodiment of an illumination light source according to principles of the present invention.

One exemplary embodiment of an illumination system 400 in which the phosphor is disposed close to the LEDs is schematically illustrated in FIG. 4. The system includes an array of one or more LEDs 102 and a light collecting/focusing unit 107. The light collecting/focusing unit may be configured differently from the illustrated embodiment, for example using a light pipe with an integrated focusing element or without a focusing element. In addition, the sidewalls may be straight or curved. In the exemplary embodiment the phosphor 428 is positioned close to, or even on, the LEDs 102. A reflective filter 430 may be placed at the output of the light collecting/focusing unit 107 to reflect light 106 at the first wavelength and to transmit light 432 at the second wavelength, generated by the phosphor 428.

The light 432 at the second wavelength is incident on a PBS 420, which transmits light 434 in one polarization state as useful output and reflects light 436 in the orthogonal polarization state. A reflector 438 reflects the light 440 back to the PBS 420, where it is reflected back towards the phosphor 428. The light 440 may subsequently be reflected back towards the PBS 420 by the phosphor 428, the LEDs 102, the baseplate 104 or some other reflecting element. A polarization rotation element 442, such as a quarter-wave retarder, may be positioned between the PBS 420 and the phosphor 428 to rotate the polarization of the reflected light 440, so as to increase the amount of light extracted by the PBS 420 as useful output 434.

In an alternative configuration, the light that is reflected by the PBS may be used as the useful output while the reflector is positioned to reflect the light that is transmitted by the PBS.

Another exemplary embodiment of an illumination system 500 is schematically illustrated in FIG. 5A. This exemplary system is similar to the system 400 illustrated in FIG. 4, except that the PBS 420 and reflector 438 are replaced with a reflecting polarizer layer 520, for example a MOF polarizer, a wire grid polarizer or a cholesteric polarizer. The reflecting polarizer layer 520 transmits light in one polarization state as useful output 534 and may reflect light 536 in the orthogonal polarization state for recycling.

Figure 5B:
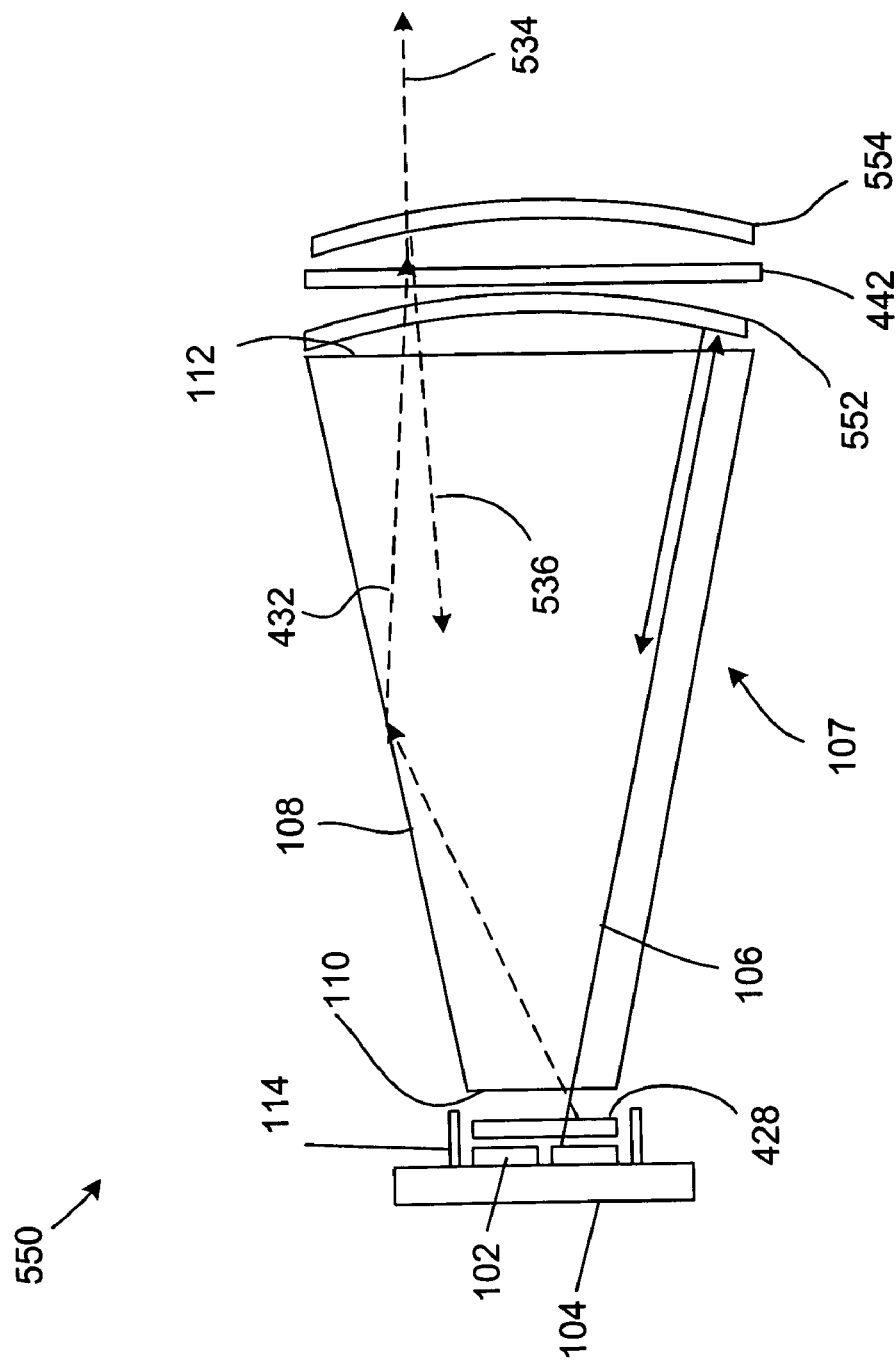

Another exemplary embodiment of an illumination system 550 is schematically illustrated in FIG. 5B. This system 550 is similar to that illustrated in FIG. 5A, except that the focusing optic 116 is omitted and the reflective filter 552 and reflecting polarizer 554 are both curved. In some embodiments, it may be desired that the centers of curvature of both the reflective filter 552 and the reflecting polarizer 554 are approximately at the phosphor 428, which reflects the light at both the first and second wavelengths. This configuration increases light 106 at the first wavelength reflected back to the LEDs 102 and the amount of light 536 at the second wavelength reflected back towards the phosphor 428. The centers of curvature may, of course, be located elsewhere. The polarization rotation element 442 may be curved to match the curve of the reflecting polarizer 554, or may be straight. Curved reflecting elements may also be used in the other embodiments described above. For example, in the system 400 schematically illustrated in FIG. 4, the reflective filter 430 and the reflector 438 may each be curved.

One characteristic of the illumination system that increases the amount of the light reflected back for recycling, be it light at the first or second wavelengths, is that reflection of the light for recycling does not substantially increase the angular range of the incident light upon reflection. This is explained further with reference to FIG. 5C, which shows the direction of light rays at various points across a non-telecentric light beam propagating along an axis 560. At the center of the beam, the center ray 562 is parallel to the axis 560, and rays 564, 566 propagate at angles a1 relative to the center ray 562. The rays 564, 566 represent the rays whose light intensity is a specified fraction of the intensity of the ray of maximum intensity, in this case the on-axis ray 562. For example, where the light beam has an f/number of 2.4, the light beam is generally accepted as having a cone half angle, $\alpha 1$, of ±11.7°, where practically all the light, at least more than 90%, is contained within the ±11.7° cone.

The dashed line 570, at the edge of the beam, is parallel to the axis 560. Ray 572, representing the direction of the brightest ray at the edge of the beam, propagates at an angle $\theta$ relative to the axis 560. Rays 574 and 576 propagate at angles of $\alpha 2$ relative to ray 572. Ideally, the value of $\alpha 2$ is close to the value of $\alpha 1$, although they need not be exactly the same.

Reflection of beam 562 by a flat mirror 568, aligned perpendicular to the axis 560, results a reflected beam that propagates parallel to the axis 560. Reflection of the beam 572 by the flat mirror 568, on the other hand, results in a reflected beam that propagates at an angle of $2\theta$ relative to the axis 560. Thus, reflection of the non-telecentric light by a flat mirror results in an increase in the angular range of the light.

On the other hand, if the light were telecentric, then beams 562 and 572 would be parallel, and reflection by the flat mirror 568 would not increase the angular range of the incident light.

Figure 5D:
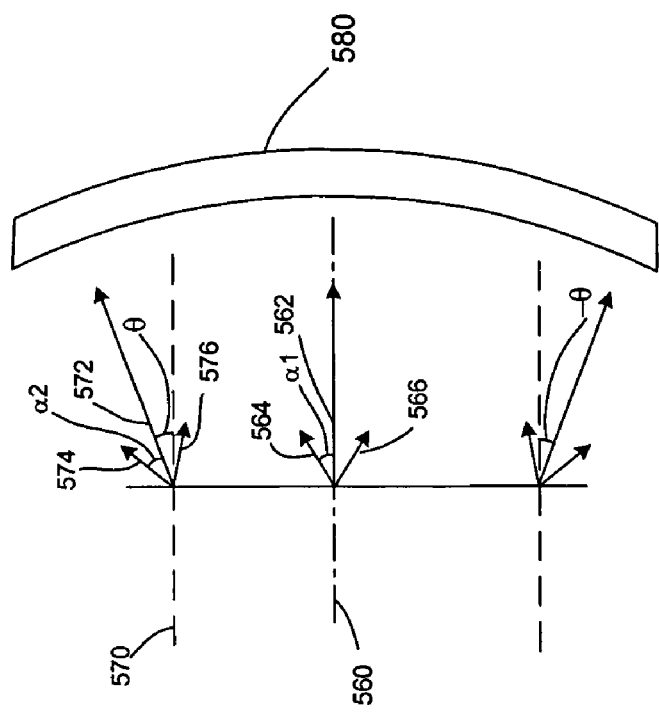
FIGS. 5C and 5D illustrate reflection of light by different types of reflectors where the light is divergent.
Figure 5C:
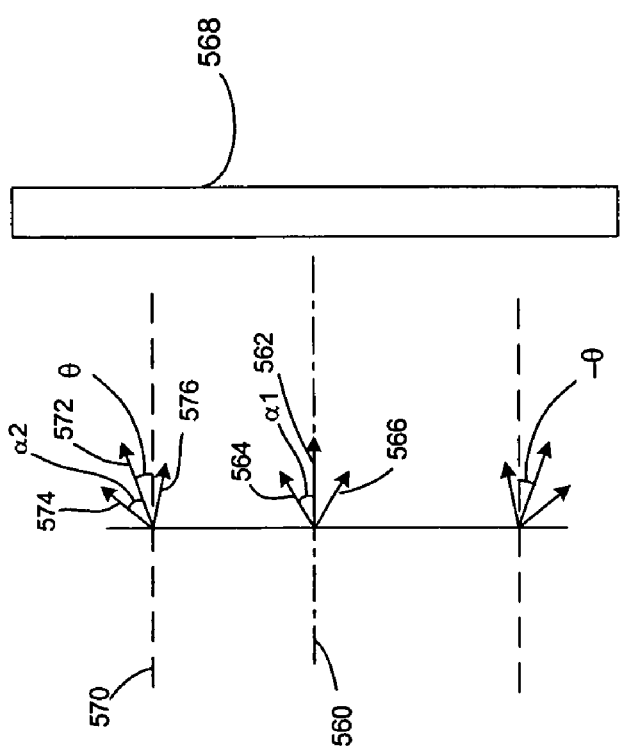

Also, reflection of the non-telecentric light by a curved mirror 580, as schematically illustrated in FIG. 5D may result in no increase in the angular range of the light where the beams 562 and 572 are each normally incident at the mirror 580.

Figure 6:
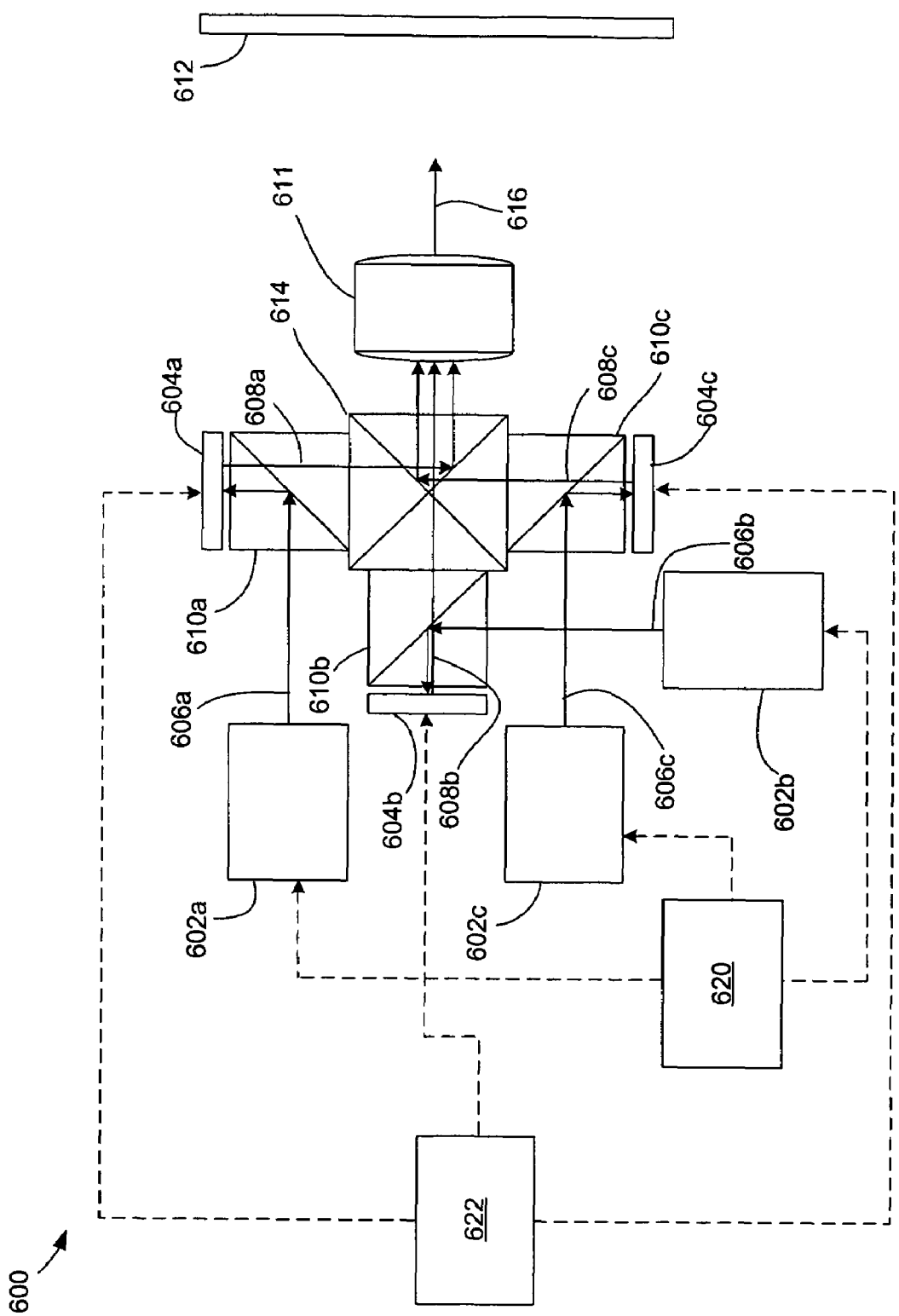
FIG. 6 schematically illustrates an embodiment of an image projection system that uses an illumination light source according to principles of the present invention.

One exemplary embodiment of a projection system 600 that may use an illumination source of the type described above is schematically illustrated in FIG. 6. The system 600 comprises a number of differently colored light sources 602a, 602b, 602c that illuminate respective image-forming devices 604a, 604b, 604c, also referred to as image-forming panels. Each light source 602a, 602b, 602c may include a number of light emitting elements, such as light emitting diodes (LEDs), and produces an output light beam having a particular color. One or more of the light sources 602a, 602b, 602c may include a phosphor for converting the wavelength of the light emitted by the LEDs, a light collecting/focusing arrangement for maintaining the étendue of the light beam and a polarizer for selecting a desired polarization state. In some embodiments, the illumination light sources 602a, 602b, 602c generate respective red, green and blue illumination light beams.

The image-forming devices 604a, 604b, 604c may be any suitable type of image-forming device. For example, the image-forming devices 604a, 604b, 604c may be transmissive or reflective image-forming devices. Liquid crystal display (LCD) panels, both transmissive and reflective, may be used as image-forming devices. One example of a suitable type of transmissive LCD image-forming panel is a high temperature polysilicon (HTPS) LCD device. An example of a suitable type of reflective LCD panel is the liquid crystal on silicon (LCoS) panel. The LCD panels modulate an illumination light beam by polarization modulating light associated with selected pixels, and then separating the modulated light from the unmodulated light using a polarizer. Another type of image-forming device, referred to as a digital multimirror device (DMD), and supplied by Texas Instruments, Plano, Tex., under the brand name DLP™, uses an array of individually addressable mirrors, which either deflect the illumination light towards the projection lens or away from the projection lens. While the illumination light sources may be used with both LCD and DLP™ type image-forming devices, there is no intention to restrict the scope of the present disclosure to only these two types of image-forming devices and illumination systems of the type described herein may use other types of devices for forming an image that is projected by a projection system. Also, it is recognized that many systems that include a DLP™ type image-forming device do not need polarized illumination light. The illustrated embodiment includes LCD-type image-forming devices for purposes of illustration only, and is not intended to limit the type of image projection system in which the illumination source is used.

The illumination light sources 602a, 602b, 602c may include beam steering elements, for example mirrors or prisms, to steer any of the colored illumination light beams 606a, 606b, 606c to their respective image-forming devices 604a, 604b, 604c. The illumination light sources 602a, 602b, 602c may also include various elements such as polarizers, integrators, lenses, mirrors and the like for dressing the illumination light beams 606a, 606b, 606c.

The colored illumination light beams 606a, 606b, 606c are directed to their respective image forming devices 604a, 604b and 604c via respective polarizing beamsplitters (PBSs) 610a, 610b and 610c. The image-forming devices 604a, 604b and 604c polarization modulate the incident illumination light beams 606a, 606b and 606c so that the respective, reflected, colored image light beams 608a, 608b and 608c are separated by the PBSs 610a, 610b and 610c and pass to the color combiner unit 614. The colored image light beams 608a, 608b and 608c may be combined into a single, full color image beam 616 that is projected by a projection lens unit 611 to the screen 612.

In the illustrated exemplary embodiment, the colored illumination light beams 606a, 606b, 606c are reflected by the PBSs 610a, 610b and 610c to the image-forming devices 604a, 604b and 604c and the resulting image light beams 608a, 608b and 608c are transmitted through the PBSs 610a, 610b and 610c. In another approach, not illustrated, the illumination light may be transmitted through the PBSs to the image-forming devices, while the image light is reflected by the PBSs.

One or more power supplies 620 may be coupled to supply power to the illumination light sources 602a, 602b, 602c. In addition, a controller 622 may be coupled to the image-forming devices 604a, 604b, 606c, for controlling the image projected image. The controller 622 may be, for example, part of a stand-alone projector, or part of a television or a computer.

It may be desired in some embodiments to use a densely packed array of LEDs, for example to achieve efficient and economic generation and collection of light. Such an array may be arranged to have an aspect ratio that is similar to that of the imaging device being illuminated and to have an étendue at least as large as that of the imaging device being illuminated.

Figure 7:
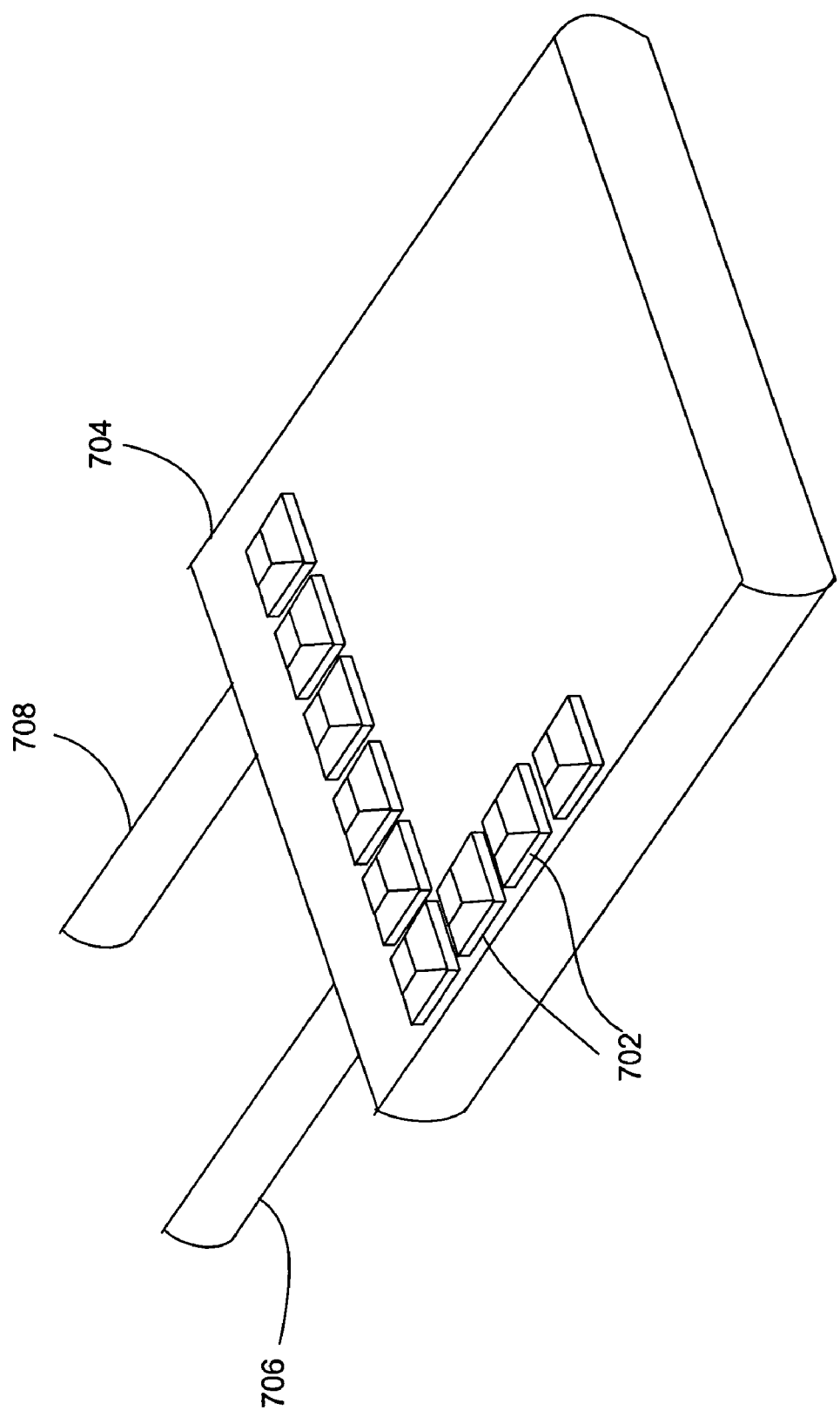
FIG. 7 schematically illustrates an embodiment of an array of LEDs on a cold plate, according to principles of the present invention.

One of the major challenges with packing LEDs densely in an array is the management of the heat flux. To help manage this heat load, the LEDs 702 may be attached directly to a liquid cooled plate 704, as is schematically illustrated in FIG. 7. The cooled plate 704 may be, for example, a liquid cooled, microchannel cold plate, having an input 706 and an output 708 for the liquid coolant. The number of LEDs 702 mounted to the cold plate 704 may be different from that shown in the figure. One suitable type of cold plate 704 plate is a Normal flow microchannel Cold Plate (NCP) available from Mikros Technologies, Claremont, N.H.

An important feature of such an arrangement is to reduce the thermal resistance from p-n junction temperature of the LEDs 702 to the liquid medium as far as possible by attaching the LEDs 702 directly to the cold plate 704. The LEDs 702 may be attached directly to the liquid cooled plate 704 using any suitable method, for example, a flux eutectic die attach method or a conductive epoxy.

The flux eutectic method used to attach the LED dies 702 to the cold plate 704 offers low electrical resistance, low thermal resistance and good mechanical and electrical integrity. It is accomplished by placing a carefully controlled amount of tacky flux on the cold plate. Next, an LED die 702 is precisely positioned on the cold plate through the tacky flux. The LED die 702 is supplied with a metal coating on its lower surface. The metal coating may be, for example, a mixture of 80:20 Au/Sn. The assembly 700 is heated above the melting point of the metal coating, so that the metal reflows, thereby attaching the LED die 702 to the cold plate 704. In some embodiments, the heating is only performed for a short period, for example reaching a temperature of about 305° C. for 5-8 seconds.

Traditionally, a reflow process is performed by directly heating the attachment substrate (e.g.: using a hot plate) or by using a stream of hot gas aimed at the top of the die. These conventional methods are not well suited to attaching the LEDS 702 to the cold plate 704, however. It is difficult to heat the substrate up to reflow temperatures and cool down again quickly enough to avoid excess dwell time at or near the process temperature. Leaving the die at the reflow temperature for too long can cause the Au/Sn to flow further than desired, and the metal may wick up the side of the LED die, resulting in an undesirable shunt or Schottky contact. Additionally, excess dwell time may cause the die to fully or partially separate from the substrate, resulting in poor electrical and thermal contact.

The conventional hot gas method can be used to heat the die and proximate substrate for a carefully controlled time, minimizing the likelihood of shunt formation or die separation. This method is used one die at a time, however, requiring 5-8 seconds of direct heating per die. This process can be quite time consuming for arrays containing many dies.

Another approach to providing the heat for the reflow process is to control the flow of hot inert gas or hot liquid through the cold plate. This method permits the entire plate 704 to be heated simultaneously, which allows batch processing for vastly improved manufacturing throughput. Also, since the full thermal mass of the cold plate 704 is not being heated externally, it is easier to control the dwell time at the reflow temperature, thus minimizing quality defects associated with excess time at the reflow temperature.

This process enables the placement of LEDs directly onto a cold plate, which is quite desirable. In conventional approaches, LEDs are mounted on an intermediate substrate that is then mounted to a heat sink. This introduces additional thermal resistance due to the extra layer of material of the intermediate substrate, and an extra thermal interface. At high flux densities, this extra resistance can substantially increase the p-n junction temperature ($T_j$) of the LEDs 702 in the array.

The omission of the intermediate substrate and thermal interface reduces the thermal resistance between the diode junction and the coolant, and so the junction operates at a cooler temperature. This decrease in operating temperature offers at least two advantages. First, the lifetime of the LEDs is increased while operating at high power, since the lifetime is related to $T_j$. Keeping the LED die cooler, therefore, increases the reliability. Secondly, higher values of $T_j$ may adversely affect the amount of light output by the LED. By keeping the $T_j$ lower, the brightness from the LED array is higher for a given input power.

One example of an array of LEDs attached directly to a cold plate includes 84 LEDs arranged in a 12×7 array. Each LED is a type 460 XT 290 blue LED, supplied by Cree Inc., Durham, N.C. Each LED is 300 μm square and they are mounted with a center-to-center spacing of 325 μm. Thus, the array has a dimension of approximately 3.9×2.25 mm: The LED die are relatively thin, around 110 μm in height, although taller LEDs may also be used. For example, Cree Type XB900 LED die, 900 μm square×250 μm high, may also be used. A wirebond wire of 25-50 μm diameter is attached to the top of each LED to provide electrical connection. The wire may be formed of any suitable material, such as gold. The cold plate serves as the common ground for all the LEDs.

The phosphor may be conformally coated over the LEDs. The phosphor material may be coated on using any suitable method. Some suitable "wet" methods include spraying the phosphor material on the LEDs and dipping the LEDs in a slurry. Other methods of applying the phosphor, such as vacuum coating methods, may be used.

Since the wavelength conversion of the phosphor is often less efficient at higher temperatures, it is important to keep the phosphor temperature low, as well as $T_j$. The configuration where the phosphor is conformally coated over the LEDs may enhance the phosphor cooling: the particular Cree LEDs discussed above are made of silicon carbide, which has a relatively high thermal conductivity, thereby reducing the thermal resistance of the heat path between the phosphor and the cold plate. Thus, another advantage of reducing the thermal resistance between the LEDs and the liquid coolant is that the phosphor may be thermally coupled to the cooling system via the LEDs.

This array is then placed as closely as possible to a tapered light pipe. Where the wire bonding is of the 'wedge' type, rather than the 'ball' type, the height of the wire bonding is reduced, and so the input face of the tapered light pipe may be placed as close as approximately 100 μm from top surface of the LED dies. The input end of the tapered light pipe may have input dimensions of approximately 2.25 mm×3.9 mm. The length of the tapered light pipe may be in the range 50 mm-60 mm long, although other lengths may also be used. In an example where the output face has sides that are 1.8 times larger than the input face, the output face has a size of approximately 7.05 mm×4.1 mm.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An illumination source, comprising:
   an arrangement of one or more light emitting diodes (LEDs) capable of generating light at a first wavelength;
   phosphor material disposed proximate the one or more LEDs, the phosphor material emitting light at a second wavelength when illuminated by the light at the first wavelength;
   a light collecting/focusing unit comprising at least a tapered optical element;
   a reflective element disposed to reflect light at the first wavelength that has passed through the phosphor material; and
   a reflective polarizer disposed to transmit telecentric light at the second wavelength in a first polarization state and to reflect telecentric light at the second wavelength in a second polarization state orthogonal to the first polarization state, light at the second wavelength reflected by the reflective polarizer being directed back towards the phosphor material without an increase in angular range.

2. A source as recited in claim 1, wherein the light at the second wavelength is telecentric at the second polarizer.

3. A source as recited in claim 1, wherein the light at the second wavelength is not telecentric at the second polarizer, and the reflective polarizer comprises a curved reflecting element.

4. A source as recited in claim 3, wherein the curved reflecting element has a radius of curvature centered approximately at the phosphor material.

5. A source as recited in claim 1, wherein the first wavelength is a blue wavelength and the second wavelength is a green wavelength.

6. A source as recited in claim 1, wherein the phosphor material comprises Eu-doped $SrGa_2S_4$.

7. A source as recited in claim 1, wherein the tapered optical element comprises flat reflecting sides.

8. A source as recited in claim 1, wherein the tapered optical element comprises curved reflecting sides.

9. A source as recited in claim 1, wherein the collimating element comprises a lens disposed proximate the output end of the tapered optical element.

10. A source as recited in claim 1, wherein the tapered optical element comprises the collimating element.

11. A source as recited in claim 10, wherein the tapered optical element comprises a transparent body with internally reflecting sidewalls and a curved output face.

12. A source as recited in claim 10, wherein the collimating element comprises curved reflecting sidewalls.

13. A source as recited in claim 1, wherein the reflective element comprises a long pass reflective filter.

14. A source as recited in claim 1, wherein the reflective polarizer comprises a multilayer optical film polarizing beamsplitter and a mirror.

15. A source as recited in claim 1, wherein the reflective polarizer comprises one of a wire grid polarizer and a cholesteric polarizer.

16. A source as recited in claim 1, further comprising a polarization control element disposed between the phosphor and the reflective polarizer.

17. A source as recited in claim 1, wherein the one or more LEDS are spaced apart from an input to the a light collecting/focusing unit, and further comprising a reflector at least partially surrounding the input so as to reflect light from the one or more LEDS towards the input that would otherwise not pass into the input.

18. A source as recited in claim 1, further comprising a power supply coupled to provide power to the one or more LEDs.

19. A source as recited in claim 1, further comprising an image-forming device, light at the second wavelength being directed to the image-forming device.

20. A source as recited in claim 19, further comprising a projection lens unit disposed to project an image form the image-forming device and a screen on which the image is projected.

21. A source as recited in claim 19, further comprising a controller coupled to control an image formed by the image-forming device.

\* \* \* \* \*

UNITED STATES PATENT AND TRADEMARK OFFICE
CERTIFICATE OF CORRECTION

PATENT NO.         : 7,445,340 B2
APPLICATION NO.    : 11/216258
DATED              : November 4, 2008
INVENTOR(S)        : Arlie R. Conner Page 1 of 1

It is certified that error appears in the above-identified patent and that said Letters Patent is hereby corrected as shown below:

<u>On the Title Page, Item -56- (Other Publications)</u>
Line 6, Before "XThin™" insert -- Technology --.

<u>Column 7</u>
Line 65, After "increases" insert -- the amount of --.

Signed and Sealed this

Tenth Day of February, 2009

JOHN DOLL
*Acting Director of the United States Patent and Trademark Office*